Patented May 26, 1953

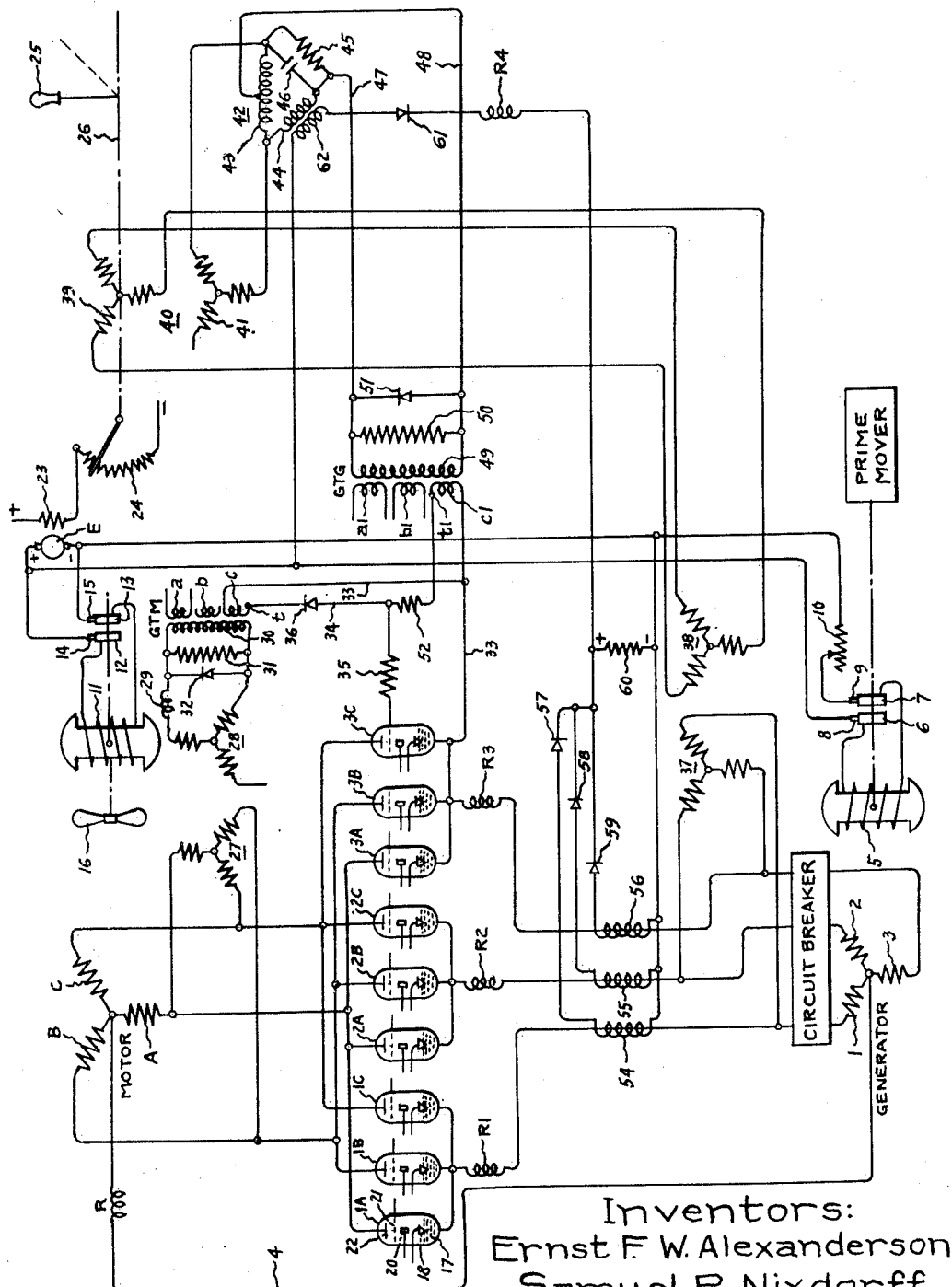

2,640,179

UNITED STATES PATENT OFFICE 2,640,179

ELECTRIC MOTOR AND STABILIZING MEANS THEREFOR

Ernst F. W. Alexanderson and Samuel P. Nixdorff, Schenectady, N. Y., assignors to General Electric Company, a corporation of New York Application February 6, 1951, Serial No. 209,647

11 Claims. (Cl. 318—434)

This invention relates to electric motors and stabilizing means therefor and more particularly to an arrangement for preventing a variable speed separately excited electric motor from stalling or operating unstably when an abnormal load is applied thereto.

In Reissue Patent Re. 20,364 Alexanderson, reissued May 18, 1937, and assigned to the assignee of the present invention, an arrangement is disclosed wherein a synchronous type electric motor is driven at variable speed from a substantially constant frequency source of power. The arrangement disclosed in this reissue patent is provided with a series field which imparts series motor characteristics to the motor disclosed in that patent.

For certain applications of electric motors, for example, where such motors are used as the propelling force for large seagoing vessels, it is not desirable to use a series field motor since it is not desirable to apply the high voltage used in conjunction with the electronic valves to the field windings of the motor. The separately excited field arrangement disclosed in the above-mentioned Reissue Patent Re. 20,364 does not prevent the ratio of armature current to field current from becoming too high when heavy loads are applied to the motors such as would be caused by maneuvering a ship powered with known separately excited electric motor arrangements. If the ratio of armature current to field current is above a predetermined value, the motor will not operate stably and may even stall.

Electric motors for heavy duty application, for example, may utilize ignitron tubes having a mercury pool cathode and provided with an auxiliary or holding anode for maintaining a cathode spot established by current flow through an igniter element immersed in the mercury pool. Such a holding anode, if continuously energized, makes it impossible to control the magnitude of current through the ignitron by controlling the instant at which a periodically energized igniter is energized relative to the anode-cathode voltage.

In application Serial No. 209,646, filed February 6, 1951, Alexanderson and Nixdorff, ignitron valves comprising an electronic motor are controlled for predetermined speed conditions by supplying a signal to the grids of the valves which is dependent on the motor voltage and another signal derived from the generator voltage is applied through suitable phase shifting means to the igniter elements of the valves. If a continuously energized holding anode were used for such an arrangement, of course, it would not be possible to effect control of the ignitron by means of the igniters.

A principal object of this invention is to provide a separately excited electric motor having means for preventing its armature current from becoming too large relative to its field current so as to insure stability of operation for all speeds of the motor.

Another object of this invention is the provision of an electric motor wherein a signal dependent upon motor voltage and a signal dependent upon generator voltage are combined to control a single control electrode of each of a plurality of electronic devices interposed between the motor and generator.

In accordance with this invention, armature current supplied through electric valves to a variable speed separately excited electric motor is controlled by means of a grid signal supplied to the valves which signal is dependent upon the condition of excitation of the motor relative to the magnitude of the motor armature current, and which is utilized effectively to control the magnitude of the armature current relative to the field excitation of the motor. According to a further feature of the invention, signals derived from both the motor and the generator voltage are supplied to the grids of the valves for the purpose of rendering the valves conductive at the proper instant irrespective of the fact that the generator and motor frequencies may be substantially different.

The invention will be better understood from the following description taken in conjunction with the single figure of the drawing which represents schematically an electric motor embodying the principles of the invention. The arrangement shown in the drawing comprises a nine-tube system but it will be understood that a different number of tubes could be used. A more practical arrangement would use eighteen tubes.

Referring to the drawing, the generator is represented as a three phase device having phase windings 1, 2 and 3. Phase 1 of the generator is connected through a suitable circuit breaker and through a suitable reactor R1 as well as through tubes 1A, 1B and 1C with the respective phase windings A, B, and C of the motor. The neutral points of the Y-connected motor and generator armature windings are interconnected by means of conductor 4 and reactor R. Phase winding 2 of the generator is connected through the circuit breaker, reactor R2, and through tubes 2A, 2B and 2C to the motor windings A, B and C. Similarly, phase winding 3 is connected through the circuit breaker, reactor R3, tubes 3A, 3B, and 3C with the motor windings.

The generator is represented schematically as being of the synchronous type in which a rotatable field winding 5 is energized through slip rings 6 and 7 and through brushes 8 and 9 and variable resistor 10 from an exciter E. As is indicated in the drawing the rotor of the generator is coupled with a suitable prime mover such as a turbine.

The motor is also represented as being of the synchronous type in which a rotatable field winding 11 is energized through slip rings 12 and 13 and through brushes 14 and 15 from the terminals of the exciter E. Load for the motor is represented schematically by the propeller 16.

The tubes, such as 1A, could be any suitable type. As illustrated, these tubes are of the type in which a mercury pool cathode 17 is utilized and preferably should utilize insulated cathodes. Immersed in the mercury pool of each valve is an igniter element 18. Each valve is provided with an auxiliary or holding anode 20, a grid 21, and a plate member 22. As is well known in connection with tubes of this type, a cathode spot is established on the surface of the mercury pool cathode 17 when electric energy is supplied to the igniters 18. This cathode spot is maintained by means of an auxiliary or holding anode 20 having suitable polarity for this purpose. Control of the tubes is obtained by means of signals supplied to the grids 21.

While the motor and generator could be operated from separate exciters, the arrangement as disclosed utilizes the single exciter E for energizing both the field 11 of the motor and the field 5 of the generator. Ordinarily, the field 11 of the motor would be saturated for normal conditions while the field 5 of the generator would be operated below the knee of its saturating curve. In this way an increase in voltage of the exciter E would increase the field 5 of the generator and hence, would increase its generated voltage tending to increase the speed of the motor. Since the field 11 of the motor would be substantially saturated for normal conditions, an increase in voltage generated by the exciter E would not materially alter the field strength of the field 11. Thus, an increase in voltage of exciter E would effect an increase in speed of the motor. Likewise, the speed of the motor would be reduced by decreasing the magnitude of the voltage produced by exciter E.

For the purpose of controlling the voltage produced by the exciter E, the field winding 23 of the exciter is energized from a source of direct current potential through the rheostat 24. Rheostat 24 is adjustable by means of the manually operable crank 25 which is connected with the rheostat through the schematically represented shaft 26.

Control of the grids 21 of the electronic valves is effected by a signal derived from motor voltage and by another signal derived from generator voltage as already explained.

For the purpose of deriving a control signal from the terminals of the motor a transformer having a primary winding 27 and a secondary winding 28 is used. Output from the secondary winding 28 is supplied through reactor 29 to the primary winding 30 of transformer GTM. Connected across the winding 30 is a resistance 31 and a unidirectional conducting device 32. These components effectively supply a peaked positive half-wave to the secondary windings $a$, $b$ and $c$ and also tend to hold the magnitude of the negative half-cycle to a minimum. In effect the rectifier 32 short circuits the negative half cycle produced by the winding 28 but allows the positive half-cycle to flow through the primary winding 30. The signal developed across the secondary windings $a$, $b$ and $c$ is supplied to the respective grids 21 of three of the tubes such as 3A, 3B and 3C. It will be understood that the arrangement as disclosed is effective to derive the voltage from one pair of conductors leading into the motor and that similar transformers such as GTM would be connected to the other two phases of winding 28 in order to energize the grids 21 of the other six tubes. The voltage developed across secondary winding $c$, for example, is fed through conductors 33 and 34 to the grid 21 of tube 3C. Included in this circuit is a grid resistor 35 and a unidirectional conducting device 36.

For the purpose of deriving a voltage from the generator terminals, means including the transformer primary winding 37 and its associated secondary winding 38 are utilized. Output from winding 38 is supplied to a winding 39 of a suitable phase shifting device generally indicated by the numeral 40. Phase shifting device 40 is provided with a secondary winding 41. A movable element of phase shift device 40 such as the winding 39 is mechanically coupled with the shaft 26 so that adjustment of the rheostat 24 through the agency of the manually operable handle 25 also effects a shift in the phase relationship between the voltage supplied to the winding 39 and the voltage output of the winding 41. Output of the winding 41 is supplied to an automatically operable phase shift device generally designated by the numeral 42. Phase shift device 42 is provided with an inductive reactance element 43 which is substantially linear and also with a non-linear inductive reactance device 44 which form a closed circuit with resistor 45 and capacitor 46. As is indicated in the drawing, output of one phase of winding 41 of phase shift device 40 is applied across the terminals of the reactor 43 of phase shift device 42. It will be understood that two other phase shift circuits such as 42 would be respectively connected across the remaining two phases of the winding 41. For purposes of simplicity, we have not shown these other two circuits.

Output from phase shift circuit 42 is fed through conductors 47 and 48 to the primary winding 49 of transformer GTG. Connected across the primary winding 49 is a resistance 50 and a unidirectional conducting device 51. Rectifier 51 effectively short circuits the negative half-cycles of energy supplied through conductors 47 and 48 so that only the positive half cycle thereof is effective to cause energization of the winding 49.

Transformer GTG is provided with three secondary windings $a1$, $b1$ and $c1$. As is shown in the drawing the terminals of the winding $c1$ are respectively connected to the cathode 17 of tube 3C and to the conductor 34 through resistance 52. In effect, the winding $c$ of transformer GTM is arranged in parallel with the winding $c1$ of transformer GTG so that if the phase relation between the voltages in these two windings is such that the lower terminal $t$ of winding $c$ is positive while the upper terminal $t1$ of winding $c1$ is also positive, a positive signal will be supplied to the grid 21 to render the associated tube conductive. If the phase relations are such that either or both the terminals *t* or *t1* is negative, the voltage to the grid 21 will be negative and the tube will not conduct.

From the description thus far it will be understood that the signals produced by the secondary windings of transformer GTM and the corresponding signals produced by the secondary windings of the transformer GTG must coincide in time so as to fire the ignitron controlled by such windings. This arrangement wherein two signals are supplied to a single control element of an ignitron effects precise control of the valve and is particularly adaptable for an ignitron arrangement wherein a holding anode such as the anodes 20 are continuously energized. With such continuous energization, control of the valves by means of the igniters is, of course, impossible.

As is well known, the magnitude of current through an electronic valve can be controlled by controlling the phase relationship of the energization of a control element of the ignitron relative to the phase of the anode-cathode voltage. In accordance with the invention, the magnitude of armature current supplied to the motor is limited to a predetermined ratio relative to the field current by utilizing control means which responds to these two quantities so as to effect a desired shift in the phase relationship of the grids 21 relative to the cathode-anode voltage.

For the purpose of deriving a quantity which is dependent upon armature current, the current transformers 54, 55 and 56 are arranged in series with each of the phase windings 1, 2 and 3 of the generator. The secondary windings of these current transformers are respectively connected through unidirectional conducting devices 57, 58 and 59 to the terminals of a resistance 60. One terminal of resistor 60 is connected to the negative terminal of exciter E while the other terminal of resistor 60 is connected through reactor R4, rectifier 61 and control winding 62 to the positive terminal of exciter E.

Thus, with a given adjustment of manually operable handle 25 which in turn supplies a predetermined field current to the winding 23 of exciter E, an increase in load on the motor will tend to increase the current output of the secondary windings of current transformers 54, 55 and 56. This increased current will, through the agency of rectifiers 57, 58 and 59, tend to make the upper terminal of resistor 60 more positive with respect to its lower terminal. This added voltage drop in the circuit comprising the terminals of exciter E, reactor R4, rectifier 61 and control winding 62 effectively reduces the magnitude of current flow through the control winding 62. Since the reactance 44 is non-linear and since a reduction in the current through its control winding 62 effectively increases the impedance of the winding 44, a shift in phase is achieved in device 42 so as to retard the instant of energizing the grid 21 of ignitron 3C and of other grids connected with windings *a1* and *b1*. The effect of such action is to limit the current through the ignitrons to a predetermined maximum value for a given excitation condition in exciter E.

In view of the above description it will be understood that an increase in load on the motor will not cause the motor promptly to break down and stall but will simply effect a limitation in the magnitude of current which the various ignitrons can conduct and in this way will limit the maximum torque that can be developed by the motor for a given field excitation. As a result the motor will simply slow down until its developed torque is adequate to accommodate the load so that, in effect, although the motor is of a synchronous type and although it is separately excited, its characteristics are similar to a direct current series excited motor particularly adaptable for use where changing load conditions are likely to be encountered.

What we claim as new and desire to secure by Letters Patent of the United States is:

1. In combination, an electric motor having an armature winding and a field winding of the separately excited type, electronic translating apparatus comprising a plurality of tubes for energizing the armature circuit of said motor, each of said tubes having a control electrode, phase controlling means for energizing said control electrodes so as to supply current to said armature, control means for deriving an electrical quantity dependent upon the motor armature current, a control circuit connected so that the energization thereof varies with variations in the excitation of said motor field and in the magnitude of the quantity derived from the motor armature current for controlling said phase controlling means, thereby to control the magnitude of current to said armature.

2. In combination, an electric motor having an armature winding and a field winding of the separately excited type, electronic translating apparatus comprising a plurality of tubes for energizing the armature circuit of said motor, each of said tubes having a control electrode, phase controlling means for energizing said control electrodes so as to supply current to said armature, control means for deriving an electrical quantity dependent upon the motor armature current, and a control circuit connected in shunt with said field and having in series therewith an element of said control means, said control circuit being connected so as to control said phase controlling means thereby to control the current to said armature.

3. In combination, an electric motor having an armature winding and a field winding of the separately excited type, electronic translating apparatus comprising a plurality of tubes for energizing the armature circuit of said motor, each of said tubes having a control electrode, means including saturable reactance means for controlling said control electrodes, a control winding for said saturable reactance means, means for deriving a quantity from the armature circuit of said motor which varies as a function of the armature current, and circuit means including said control winding, said circuit means being connected so that the energization thereof varies with variations in the quantity derived from the armature current and with variations in the excitation of said field.

4. In combination, an electric motor having an armature winding and a field winding of the separately excited type, electronic translating apparatus comprising a plurality of tubes for energizing the armature circuit of said motor, each of said tubes having a control electrode, phase controlling means for energizing said control electrodes so as to supply current to said armature, control means for deriving a voltage dependent upon the motor armature current, circuit means for comparing said voltage with a voltage which is representative of the excitation of said motor and for supplying the resultant voltage to said phase controlling means, the magnitude of said resultant voltage being such that the instant of energization of said electrodes is retarded by said phase controlling means if the armature current exceeds a predetermined value for a given field excitation condition.

5. In combination, an electric motor having an armature winding and a field winding of the separately excited type, electronic translating apparatus comprising a plurality of tubes for energizing the armature circuit of said motor, each of said tubes having a control electrode, means for deriving an electrical quantity dependent upon the motor armature current, means including circuit means for comparing said quantity with another quantity which is indicative of the excitation of said motor and for controlling the energization of said electrodes in accordance with the magnitude of the resultant of said quantities so as to limit the magnitude of current supplied to the armature of said motor to a predetermined value for a given field excitation condition.

6. In combination, a source of alternating current energy, an electric motor of the separately excited type, electronic translating apparatus comprising a plurality of tubes for energizing the armature circuit of said motor from said source, each of said tubes having a control electrode and a cathode, first means for deriving a control signal dependent upon the frequency of said source, second means for deriving a control signal dependent upon the frequency of the motor, and circuit means for connecting said first and second means in parallel between the cathode and control grid of each of said tubes.

7. An electric motor comprising a synchronous type motor having an armature winding and a field winding, electronic translating apparatus arranged to energize said armature winding, said apparatus comprising a plurality of electronic tubes each having a control electrode, a source of separate excitation for energizing said field winding, a control circuit for energizing said control electrodes, means for deriving an electrical quantity dependent upon the armature current of said motor and for comparing said quantity with a quantity which is indicative of the excitation of said motor to produce a resultant quantity, and control means the energization of which is dependent upon said resultant quantity for controlling said control circuit so as to limit the magnitude of armature current to said motor for a given field current.

8. An electric motor comprising a synchronous type motor having an armature winding and a field winding, electronic translating apparatus arranged to energize said armature winding, said apparatus comprising a plurality of electronic tubes each having a control electrode, a source of separate excitation for energizing said field winding, a control circuit for energizing said control electrodes, circuit means including a transformer, a rectifier, and a resistor arranged in series for deriving an electrical quantity dependent upon the armature current of said motor and for comparing said quantity with a quantity which is indicative of the excitation of said motor to produce a resultant quantity, and control means the energization of which is dependent upon said resultant quantity for controlling said control circuit so as to limit the magnitude of armature current to said motor for a given field current.

9. An electric motor comprising an armature winding and a field winding, electronic translating apparatus arranged to energize said armature winding, said apparatus comprising a plurality of electronic tubes each having a control electrode, a source of separate excitation for energizing said field winding, a control circuit for energizing said control electrodes, means including a transformer, a rectifier, and a resistor arranged in series for deriving an electrical quantity dependent upon the armature current of said motor, and means including a control winding arranged in series with said resistor for controlling said control circuit, said last mentioned means being connected across said source of excitation.

10. An electric motor comprising an armature winding and a field winding, electronic translating apparatus arranged to energize said armature winding, said apparatus comprising a plurality of electronic tubes each having a control electrode, a source of separate excitation for energizing said field winding, a control circuit for energizing said control electrodes, means including a transformer, a rectifier, and a resistor arranged in series for deriving an electrical dependent upon the armature current of said motor, and means including a control winding arranged in series with said resistor for controlling said control circuit, said last mentioned means being connected across said source of excitation, the voltage across said resistor being in opposition to the voltage of said source of excitation.

11. An electric motor comprising an armature winding and a field winding, electronic translating apparatus arranged to energize said armature winding, said apparatus comprising a plurality of electronic tubes each having a control electrode, a source of separate excitation for energizing said field winding, a control circuit including a saturable reactor for energizing said control electrodes, means including a transformer, a rectifier, and a resistor arranged in series for deriving an electrical quantity dependent upon the armature current of said motor, and means including a control winding arranged in series with said resistor for controlling the reactance of said saturable reactor, said last mentioned means being connected across said source of excitation, the voltage across said resistor being in opposition to the voltage of said source of excitation.

ERNST F. W. ALEXANDERSON.
SAMUEL P. NIXDORFF.

References Cited in the file of this patent

UNITED STATES PATENTS

| Number | Name | Date |
|---|---|---|
| 2,082,496 | Howe | June 1, 1937 |
| 2,239,289 | Goodhue et al. | Apr. 22, 1941 |